United States Patent [19]

Russell

[11] 4,261,518
[45] Apr. 14, 1981

[54] BURNER CAP FOR SYNTHESIS OF HYDROGEN CHLORIDE BY COMBUSTION

[75] Inventor: Richard R. Russell, Orange Village, Ohio

[73] Assignee: Union Carbide Corporation, New York, N.Y.

[21] Appl. No.: 46,626

[22] Filed: Jun. 8, 1979

[51] Int. Cl.³ .............................................. B05B 7/06
[52] U.S. Cl. .................................................. 239/424.5
[58] Field of Search ............... 239/423, 425, 424.5, 239/433, 434.5, 418, 422, 424; 431/129, 144

[56] References Cited

U.S. PATENT DOCUMENTS

| | | | |
|---|---|---|---|
| 1,955,120 | 4/1934 | Fausels et al. | 239/424.5 |
| 2,054,601 | 9/1936 | Jenkins | 239/422 X |
| 3,364,970 | 1/1968 | Dombruch et al. | 239/424.5 X |

FOREIGN PATENT DOCUMENTS 241354  11/1942  Switzerland ........................... 239/433

Primary Examiner—Robert B. Reeves
Assistant Examiner—Gene A. Church
Attorney, Agent, or Firm—J. Hart Evans

[57] ABSTRACT

Hydrogen and chlorine are burned to form hydrogen chloride gas using an improved burner which generates a flame of a diameter not much greater than the burner cap diameter, thereby avoiding impingement on the walls of the combustion vessel.

13 Claims, 4 Drawing Figures

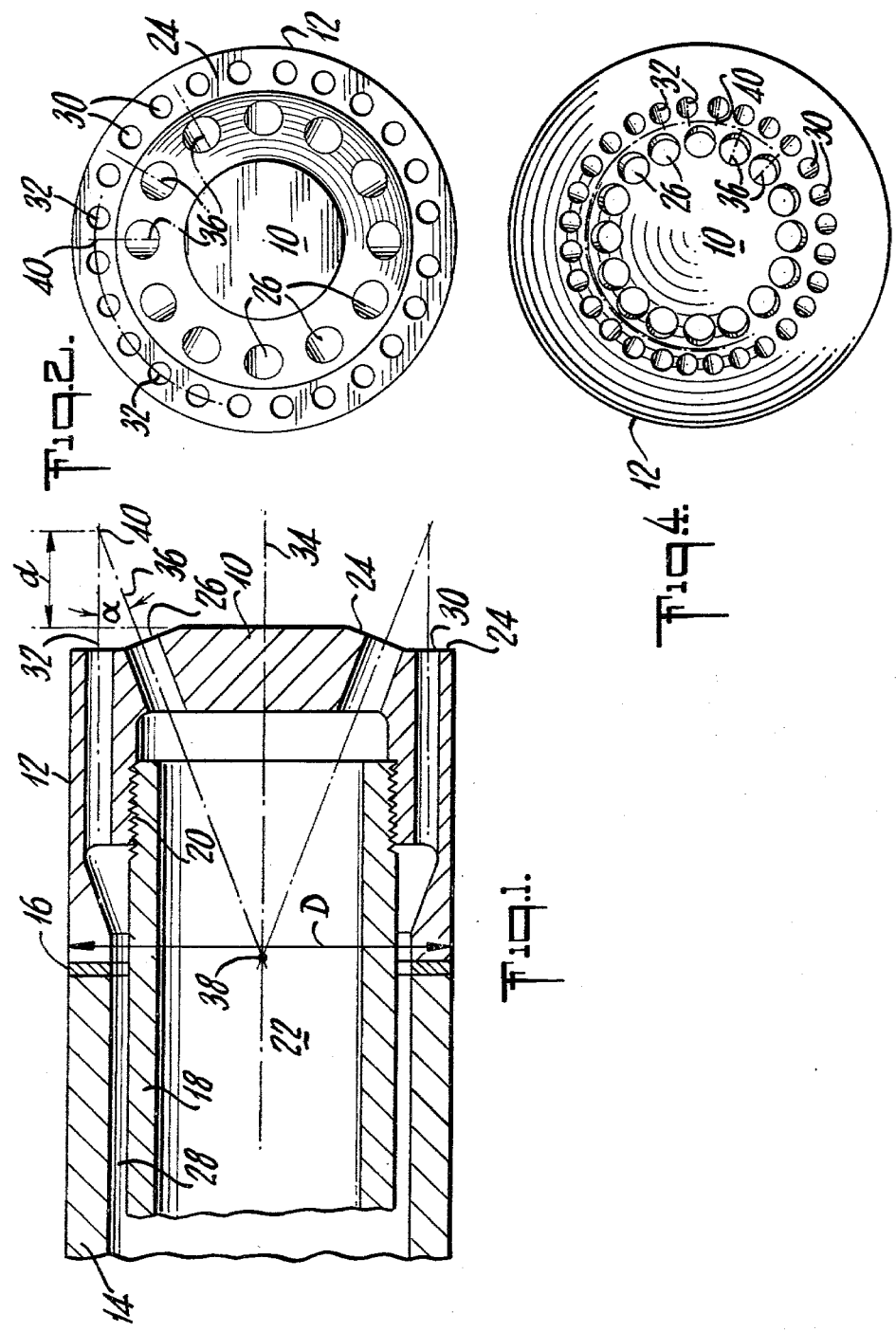

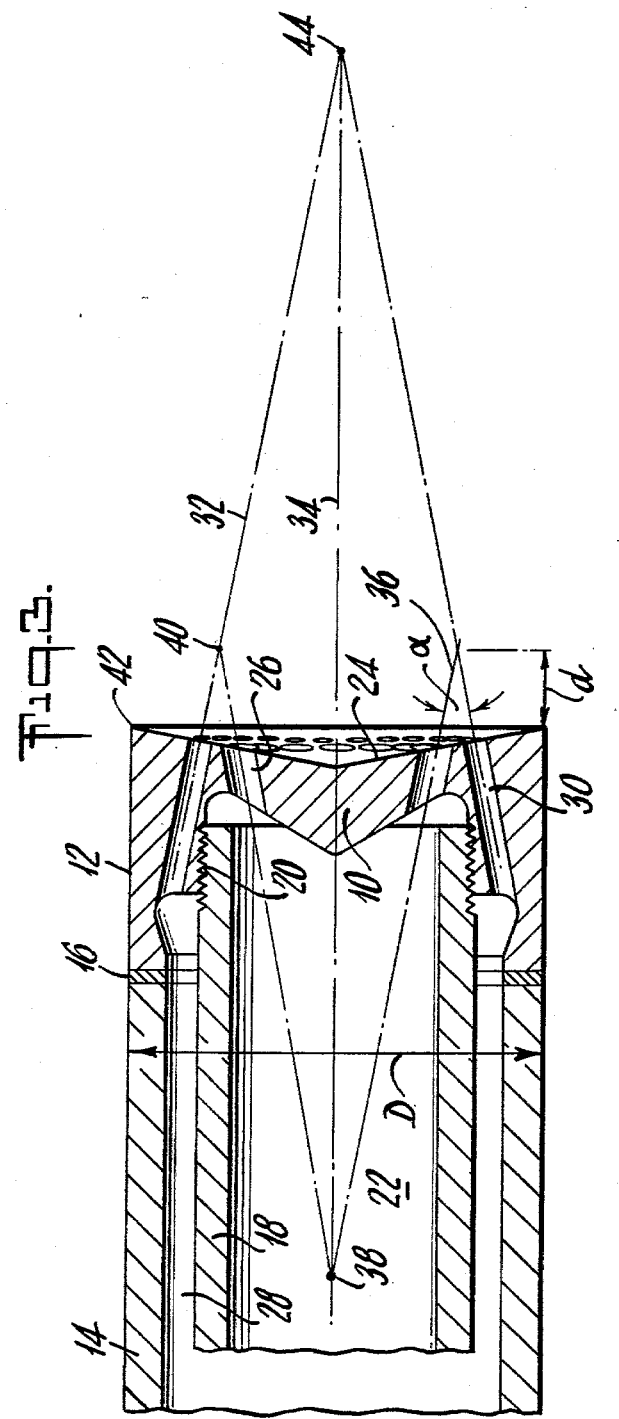

BURNER CAP FOR SYNTHESIS OF HYDROGEN CHLORIDE BY COMBUSTION

BACKGROUND OF THE INVENTION

Hydrochloric acid is produced commercially by burning hydrogen and chlorine to form hydrogen chloride gas, which is then dissolved in water to form the desired hydrochloric acid. Typically the hydrogen and chlorine are introduced into a vertical graphite chamber approximately 25 to 40 feet high with an inside diameter of about 33 inches, through a burner cap. The conventional burner cap resembles a short piece of pipe with one end closed or capped and separate hydrogen and chlorine orifices in the sides of the cap through which the gases exit separately to mix and burn at the outside surface of the burner cap. The graphite chamber serves as a holder for the flame and also cools the product hydrogen chlorine gas with a film of water flowing down the outside of the chamber. The discharge through the side walls of the conventional burner cap is essentially radial so that a bowl shaped flame is generated by the combustion. The flow rate of the gases fed to the burner cap must be controlled so that the flame generated does not impinge on the interior walls of the graphite combustion chamber. Flame contact with the graphite walls, which are relatively expensive, would result in their rapid destruction. The necessity to avoid such flame contact restricts the capacity of the burner assembly accordingly.

SUMMARY OF THE INVENTION

We have now discovered that the capacity and efficiency of the combustion chamber can be greatly increased by an improved burner cap construction which produces a different type of flame. According to our invention the hydrogen gas and chlorine gas orifices in the burner cap are in the end wall of the burner cap rather than the side walls, and the streams of the gases are so directed that combustion occurs beyond the end wall. The flame produced has a diameter not much greater than that of the burner cap. High rates of combustion efficiency are achieved without any problem of impingement of the flame on the graphite walls of the combustion chamber.

THE DRAWINGS

FIG. One is a section view of an embodiment of the invention wherein the center lines of the hydrogen orifices are parallel to center line of the burner cap.

FIG. Two is an end view of the burner cap shown in FIG. One.

FIG. Three is a section view of an embodiment of the invention wherein the center lines of the hydrogen orifices form a cone.

FIG. Four is an end view of the burner cap shown in FIG. Three.

The invention can be better understood by a detailed consideration of the drawing. In FIG. One the outer sidewall 12 of the burner cap 10 is cylindrical in shape with an outside diameter "D". The burner outer wall member 14 joins the outer burner cap side wall 10 at a gasketed joint 16. The burner inner wall member 18 is screwed into the burner cap 10 by threads 20. Chlorine gas is introduced into the burner cap 10 through the central conduit 22 and is discharged through the burner cap end wall 24 through chlorine orifices 26. Hydrogen gas is introduced into the burner cap 10 through the annular conduit 28 and is discharged through the burner cap end wall 24 through hydrogen orifices 30.

In the embodiment shown in FIG. One the multiple hydrogen orifices 30 have hydrogen orifice center lines 32 which are parallel to the burner cap center line 34. The hydrogen orifices 30 form a circular pattern in the burner cap end wall 24 as can be seen in FIG. Two. The chlorine orifice center lines 36 form a conical figure with the chlorine orifice center line apex 38 inside the burner cap end wall 24 and on the burner cap center line 34. The cylindrical figure formed by the hydrogen orifice center lines 30 and the conical figure generated by the chlorine discharge orifice center lines 36 intersect in center line figure intersection circle 40. The character of the combustion flame is determined in part by the distance "d" of intersection 40 from the outer end wall surface 42 of the burner cap end wall 24. This distance determines the acute angle $\alpha$ formed by this intersection.

The embodiment of FIGS. Three and Four is similar to that of FIGS. One and Two and the components are numbered similarly. The principal difference is the positioning of the hydrogen orifices 30. In this embodiment the hydrogen orifice center lines 32 form a conical figure with the hydrogen orifice center line apex 44 outside the burner cap 24 and on the burner cap center line 34. The intersection of this conical figure with the conical figure generated by the chlorine discharge orifice center lines 36 is center line figure intersection circle 40. This configuration results in a combustion flame which is smaller in diameter than that generated by the burner cap configurations shown in FIGS. One and Two.

With either construction shown, or any variation within the scope of the claim, the distance d of the centerline figure intersection circle 40 from the outer end wall surface 42 should be no greater than sixty percent of the outer diameter D of the burner cap 10. Preferably the distance d is from twenty to sixty percent of the diameter D. When the hydrogen discharge orifice center lines 32 are parallel to the burner cap center line 34 the distance is most preferably about fifty percent of the outer diameter D of the burner cap 10. When the extended center lines 32 of the hydrogen discharge orifices form a conical figure with its apex outside the burner cap end wall 24 this distance d is most preferably about forty percent of the diameter D.

The acute angle $\alpha$ generated by the intersection of the hydrogen discharge orifice center lines 32 and the chlorine discharge orifice center lines 36 is from 10 to 40 degrees and preferably from 15 to 27 degrees. Preferred angles when the hydrogen discharge orifice center lines 32 are parallel to the burner cap center line 34 are about 20 degrees and about 27 degrees. When the extended center line 32 of the hydrogen discharge orifices 30 form a conical figure the preferred angle $\alpha$ is about 15 degrees.

Burner caps according to the invention are readily machined from a graphite. Burner caps constructed according to the invention developed desired flame structures which were vertical and cylindrical in shape with narrow diameter. The flame structures were stable over a wide range of test conditions. Even at maximum flow rates of the hydrogen, and of the air used in place of chlorine for the tests, there was no tendency for the flame to "lift-off" the surface of the burner cap. Air was substituted for chlorine in the testing because the water produced was nonpolluting in the test atmosphere as compared to the hydrochloric acid vapor which would otherwise be produced. This change does not offset comparison of burner production capacity.

A burner cap constructed according to FIG. One of the drawing was substituted in a test rig for a conventional burner cap designed to burn 71.2 pounds per hour of hydrogen. Using air in place of chlorine to avoid pollution, a test of an 8 inch diameter cap burned 141.7 pounds per hour of hydrogen. An 8 inch diameter burner cap according to FIG. Three burned 129.6 pounds per hour of hydrogen. This doubling or near doubling of capacity for a combustion chamber represents a substantial commercial benefit and an advantage to be derived from the invention. Both test burner caps were able to operate at or near twice the current standard design rate without thermal capacity limitations, even though burning hydrogen in air releases about six times the heat of the hydrogen-chlorine flame reaction. The maximum cap temperature of 90° C. was reached at the minimum burning rates. That is, the cap temperature was inversely proportional to the burning rate, due to the cooling effect of higher gas flows. This cooler operation is expected to result in greatly extended life for the caps of the invention as compared to conventional caps. Experience in commercial installations has confirmed the test data with runs producing from 70 to 100 percent above design capacity of the conventional burner.

While burner caps according to the invention can be readily machined from graphite, other suitable methods and materials can be used. Thus quartz, fused silica and other ceramic materials can be molded to the desired burner cap shape.

What is claimed is:

1. A burner cap for the combustion of hydrogen gas and chlorine gas to produce hydrogen chloride gas, said burner cap comprising:
   a hollow cylinder with an end wall closing one end and the other end adapted to receive gas supply conduits,
   a plurality of hydrogen discharge orifices piercing said end wall in a circular pattern and connected inside said end wall to a hydrogen supply conduit,
   a plurality of chlorine discharge orifices piercing said end wall in a circular pattern, said pattern being of smaller diameter than the said circular pattern of said hydrogen discharge orifices and said chlorine discharge orifices being connected inside said end wall to a chlorine supply conduit.
   the projected center lines of said hydrogen discharge orifices outside said end wall forming a cylindrical figure or a conical figure with its apex outside said end wall on the center line of said burner cap,
   the projected center lines of said chlorine discharge orifices forming a conical figure with its apex inside said end wall on the center line of said burner cap,
   the intersection of said hydrogen discharge orifice figure and said chlorine discharge orifice figure being at a distance from the outer surface of said end wall no greater than sixty percent of the outer diameter of said burner cap.

2. A burner cap according to claim 1, wherein the projected center lines of said hydrogen discharge orifices are parallel to the center line of said burner cap.

3. A burner cap according to claim 1, wherein the projected center lines of said hydrogen discharge orifices form a conical figure with its apex outside said end wall on the center line of said burner cap.

4. A burner cap according to claim 1, wherein said intersection of said hydrogen discharge orifice center line figure and said chlorine discharge orifice center line figure is at a distance from the plane of the outer surface of said end wall equal to from twenty to sixty percent of the outer diameter of said burner cap.

5. A burner cap according to claim 2, wherein said intersection of said hydrogen discharge orifice center line figure and said chlorine discharge orifice center line figure is at a distance from the plane of the outer surface of said end wall equal to about fifty percent of the outer diameter of said burner cap.

6. A burner cap according to claim 3, wherein said intersection of said hydrogen discharge orifice center line figure and said chlorine discharge orifice center line is at a distance from the plane of the outer surface of said end wall equal to about forty percent of the outer diameter of said burner cap.

7. A burner cap for the combustion of hydrogen gas and chlorine gas to produce hydrogen chloride gas, said burner cap comprising;
   a hollow cylinder with an end wall closing one end and the other end adapted to receive gas supply conduits,
   a plurality of hydrogen discharge orifices piercing said end wall in a circular pattern and connected inside said end wall to a hydrogen supply conduit,
   a plurality of chlorine discharge orifices piercing said end wall in a circular pattern, said pattern being of smaller diameter than the said circular pattern of said hydrogen discharge orifices and said chlorine discharge orifices being connected inside said end wall to a chlorine supply conduit,
   the projected center lines of said hydrogen discharge orifices outside said end wall forming a cylindrical figure or a conical figure with its apex outside said end wall on the center line of said burner cap,
   the projected center lines of said chlorine discharge orifices forming a conical figure with its apex inside said end wall on the center line of said burner cap,
   the intersection of said hydrogen discharge orifice figure and said chlorine discharge orifice figure generating in a plane of the center line of said burner cap an acute angle of from 10 to 40 degrees.

8. A burner cap according to claim 5, wherein the projected center lines of said hydrogen discharge orifices are parallel to the center line of said burner cap.

9. A burner cap according to claim 5, wherein the projected center lines of said hydrogen discharge orifices form a conical figure with its apex outside said end wall on the center line of said burner cap.

10. A burner cap according to claim 7 wherein said acute angle is from 15 to 27 degrees.

11. A burner cap according to claim 8 wherein said acute angle is about 20 degrees.

12. A burner cap according to claim 8 wherein said acute angle is about 27 degrees.

13. A burner cap according to claim 9 wherein said acute angle is about 15 degrees.

* * * * *